United States Patent
Subramanian et al.

(10) Patent No.: US 9,571,663 B1
(45) Date of Patent: *Feb. 14, 2017

(54) USAGE MONITORING CONTROL FOR MOBILE NETWORKS

(71) Applicant: Juniper Networks, Inc., Sunnyvale, CA (US)

(72) Inventors: Jegan Kumar Somi Ramasamy Subramanian, Bangalore (IN); Prasad Chigurupati, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/009,788

(22) Filed: Jan. 28, 2016

Related U.S. Application Data

(63) Continuation of application No. 14/499,541, filed on Sep. 29, 2014, now Pat. No. 9,253,335.

(51) Int. Cl.
*H04M 11/00* (2006.01)
*H04M 15/00* (2006.01)
*H04W 88/16* (2009.01)

(52) U.S. Cl.
CPC ............ *H04M 15/58* (2013.01); *H04M 15/66* (2013.01); *H04M 15/8228* (2013.01); *H04W 88/16* (2013.01)

(58) Field of Classification Search
CPC ........ H04W 4/02; H04W 12/08; H04W 28/16; H04W 4/26
USPC ................................. 455/406, 408
See application file for complete search history.

(56) References Cited

U.S. PATENT DOCUMENTS

| | | |
|---|---|---|
| 8,605,655 B1 | 12/2013 | Sahai et al. |
| 8,650,279 B2 | 2/2014 | Mehta et al. |
| 8,948,174 B2 | 2/2015 | Szyszko et al. |
| 9,179,009 B1 | 11/2015 | Subramanian et al. |
| 9,253,335 B1 | 2/2016 | Subramanian et al. |
| 9,258,433 B1 | 2/2016 | Subramanian et al. |
| 2008/0046963 A1 | 2/2008 | Grayson et al. |
| 2008/0310319 A1 | 12/2008 | Kitamura et al. |
| 2011/0238547 A1 | 9/2011 | Belling et al. |
| 2012/0233325 A1 | 9/2012 | Zhou et al. |
| 2013/0003736 A1 | 1/2013 | Szyszko et al. |
| 2013/0007237 A1 | 1/2013 | Mehta et al. |
| 2014/0187195 A1 | 7/2014 | Pallares Lopez et al. |
| 2014/0233432 A1 | 8/2014 | Lim et al. |
| 2015/0117226 A1 | 4/2015 | Kim et al. |

OTHER PUBLICATIONS

"Policy and Charging Control Rules Overview" Technical Documentation—Support—Juniper Networks, available at http://www.juniper.net/techpubs/en_US/junos-mobility12.1/topics/concept/pcef-mobility-pcc-rules-overview.html, accessed Sep. 15, 2014, published Jun. 2, 2013, 3 pgs.

(Continued)

*Primary Examiner* — Charles Shedrick
(74) *Attorney, Agent, or Firm* — Shumaker & Sieffert, P.A.

(57) ABSTRACT

In general, techniques are described for facilitating usage monitoring control in mobile networks. A mobile gateway comprising one or more processors may be configured to perform the techniques. The one or more processors are configured to establish a session by which a mobile device is to access a service, and in response to receiving an indication to activate a charging rule having an incomplete indication to activate usage monitoring with respect to the service provided via the session, rejecting the charging rule.

20 Claims, 7 Drawing Sheets

(56) References Cited

OTHER PUBLICATIONS

"Policy Use Case—Usage Monitoring and Reporting" Developing Solutions, Inc. available at http://www.developingsolutions.com/use-cases/policy-use-case-usage-monitoring-and-reporting/ accessed Sep. 15, 2014, 3 pgs.

"Resource: 3GPP Traffic Detection Function (TDF)/Service Awareness Overview", Broadband Traffice Management, available at http://broabandtrafficmanagement.blogspot.com/2011/08/resource-3gpp-traffic-detection.html accessed Sep. 15, 2014, May 30, 2011, 18 pgs.

"SD Interface" Developing Solutions, Inc. available at http://www.developingsolutions.com/products/sd-interface/ accessed Sep. 15, 2014, 2 pgs.

"Technology Showcase—Traffic Detection Function" Sandvine, Dec. 13, 2013, 10 pgs.

3GPP TS 23.203—Policy and charging control architecture (Release 10), Version 10.1.0, 3rd Generation Partnership Project, Technical Specification Group Services and System Aspects, Sep. 2010, 132 pp.

3GPP TS 23.203 V11.8.0, "3rd Generation Partnership Project; Technical Specification Group Services and Systems Aspects; Policy and charging control architecture; (Release 11)," Technical Specification, Dec. 2012, 179 pp.

3GPP TS 23.401, V10.0.0, 3rd Generation Partnership Project; Technical Specification Group Services and System Aspects; General Packet Radio Service (GPRS) enhancements for Evolved Universal Terrestrial Radio Access Network (E-UTRAN) access (Release 10), Jun. 2010, 261 pp.

3GPP TS 29.212 V11.7.0, 3rd Generation Partnership Project; Technical Specification Group Services and Systems Aspects; Policy and Charging Control (PCC); Reference points (Release 11), Technical Specification, Dec. 2012, 196 pp.

3GPP TS 29.212, V12.3.0, 3rd Generation Partnership Project, Technical Specification Group Core Network and Terminals, Policy and Charging Control (PCC); Reference points (Release 12), Dec. 2013, 217 pgs.

3GPP TS 32.240, V12.0.0, 3rd Generation Partnership Project, Technical Specification Group Services and System Aspects, Telecommunication Management; Charging Management; Charging architecture and principles (Release 12), Mar. 2013, 45 pgs.

3GPP TS 32.299, V11.6.0, 3rd Generation Partnership Project, Technical Specification Group Services and System Aspects, Diameter charging applications (Release 11), Dec. 2012, 152 pgs.

3GPP TS 36.300 v10.0.0—Evolved Universal Terrestrial Radio Access (E-UTRA) and Evolved Universal Terrestrial Radio Access Network Evolved Universal Terrestrial Radio Access Network (E-UTRAN) Overall Description, Release 10, 3rd Generation Partnership Project, Technical Specification Group Radio Access Network, Jun. 2010, 183 pgs.

Hakala et al. "Diameter Credit-Control Application" Network Working Group, RFC 4006, Aug. 2005, 115 pgs.

U.S. Appl. No. 13/902,567, filed May 24, 2013 entitled Rating Group-Specific Actions for Mobile Networks.

Prosecution History from U.S. Appl. No. 14/499,541, dated Aug. 13 through Dec. 18, 2015, 22 pp.

Prosecution History from U.S. Appl. No. 14/499,518, dated Jul. 29, 2015 through Nov. 19, 2015, 20 pp.

Office Action from U.S. Appl. No. 15/018,386, dated Mar. 23, 2016, 6 pp.

Office Action from U.S. Appl. No. 14/499,530, dated Aug. 3, 2015, 8 pp.

Office Action from U.S. Appl. No. 14/929,985, dated Dec. 18, 2015, 6 pp.

Notice of Allowance from U.S. Appl. No. 15/018,386, mailed Sep. 27, 2016, 5 pp.

Notice of Allowance from U.S. Appl. No. 14/929,985, mailed Sep. 28, 2016, 5 pp.

USAGE MONITORING CONTROL FOR MOBILE NETWORKS

This application is a continuation of U.S. patent application Ser. No. 14/499,541, filed Sep. 29, 2014, the entire contents of which is incorporated herein by reference.

TECHNICAL FIELD

This disclosure relates to computer networks and, more specifically, to usage monitoring control for mobile networks.

BACKGROUND

A cellular radio access network is a collection of cells that each includes at least one base station capable of transmitting and relaying signals to subscribers' wireless devices. A "cell" generally denotes a distinct area of a mobile network that utilizes a particular frequency or range of frequencies for transmission of data. A typical base station is a tower to which are affixed a number of antennas that transmit and receive the data over the particular frequency. Wireless devices, such as cellular or mobile phones, smart phones, camera phones, personal digital assistants (PDAs) and laptop computers, may initiate or otherwise transmit a signal at the designated frequency to the base station to initiate a call or data session and begin transmitting data.

Mobile networks convert cellular signals, e.g., Time Division Multiple Access (TDMA) signals, Orthogonal Frequency-Division Multiplexing (OFDM) signals or Code Division Multiple Access (CDMA) signals, received at a base station from wireless devices into Internet protocol (IP) packets for transmission within packet-based networks. A number of standards have been proposed to facilitate this conversion and transmission of cellular signals to IP packets, such as a general packet radio service (GPRS) standardized by the Global System for Mobile Communications (GSM) Association, an evolution of UMTS referred to as Long Term Evolution (LTE), mobile IP standardized by the Internet Engineering Task Force (IETF), as well as other standards proposed by the $3^{rd}$ Generation Partnership Project (3GPP), $3^{rd}$ Generation Partnership Project 2 (3GGP/2) and the Worldwide Interoperability for Microwave Access (WiMAX) forum.

A typical mobile service provider network, or "mobile network," includes a core packet-switched network, a transport network, and one or more radio access networks. The core packet-switched network for the mobile network establishes logical connections, known as bearers, among the many service nodes on a path between a wireless device, attached to one of the radio access networks, and a packet data network (PDN). The service nodes then utilize the bearers to transport subscriber traffic exchanged between the wireless device and the PDN, which may include, for example, the Internet, an enterprise intranet, a layer 3 VPN, and a service provider's private network. Various PDNs provide a variety of packet-based data services to wireless devices to enable the wireless devices to exchange service data with application or other servers of the PDNs. In addition, while primarily described with respect to service providers and mobile service provider networks, a mobile network may be deployed by many different types of entities, including enterprises and government agencies. Accordingly, the term "mobile network" may be used herein to encompass many different types of cellular network architectures and operators.

Mobile networks perform detailed and accurate monitoring of service usage so that proper charging information can be generated for potentially millions of customers in order to provide revenue for the service providers. In general, there are three distinct aspects to the process that translates service use into a bill for services—charging, rating and billing. Charging gathers statistics regarding service usage for each customer. Rating is the process of determining how much each service used costs each particular customer according to the service contract. Billing is the process of generated a customer's invoice for services.

The mobile network gateway anchors subscriber sessions and executes network access control functions including charging control (also known as Policy and Charging Enforcement Function for 3GPP networks or the initialism PCEF), which refers to the process of associating packets that belong to a service data flow to a charging key and applying online charging and/or offline charging, as appropriate (where a charging key includes information used by the charging online and offline charging servers for rating purposes). Accordingly, the mobile network gateway collects charging information related to the external data network usage and to network resource usage, such as the amount of data categorized by quality of service (QoS), the user protocols, and the usage of the packet data protocol (PDP) address.

A mobile network gateway typically cooperates with online and offline charging server to perform the charging and rating processes in order to generate the charging information. In general, offline charging denotes a charging mechanism in which charging information does not affect, in real-time, the service(s) rendered. The network reports resource usage to the billing domains after the resource usage has occurred. By contrast, online charging can affect, in real-time, the service(s) rendered and therefore requires a direct interaction between the mobile network gateway and the online charging server for subscriber session and/or service(s) control. An online charging server typically maintains subscriber accounts that may be queried prior to granting permission to use requested network resources.

In the 3GPP TS 29.212 standard, there are a number of different ways by which to activate or otherwise enable usage monitoring for purposes of policy and charging control. Likewise, the 3GPP TS 29.212 standard provides a number of different ways by which to deactivate or otherwise disable usage monitoring. Additional information regarding charging control and management is found in "3GPP TS 29.212," $3^{rd}$ Generation Partnership Project, Technical Specification Group Core Network and Terminals, Policy and Charging Control (PCC); Reference points (Release 12), December, 2013; "3GPP TS 32.299," $3^{rd}$ Generation Partnership Project, Technical Specification Group Services and System Aspects, Diameter charging applications (Release 11), December, 2012; "3GPP TS 32.240," $3^{rd}$ Generation Partnership Project, Technical Specification Group Services and System Aspects, Charging architecture and principles (Release 12), March, 2013; and "Diameter Credit-Control Application," Request for Comments 4006, Internet Engineering Task Force, Network Working Group, August 2005; each of which being incorporated by reference in its entirety herein. However, discrepancies exist in various usage monitoring activation and deactivation scenarios that may result in mobile session disruptions and/or inaccurate usage monitoring.

SUMMARY

In general, techniques are described for usage monitoring control in the context of mobile or wireless access networks.

The techniques may enable a network device, such as a router operating as a packet data network (PDN) gateway (PGW) within a 3GPP-compliant mobile access network, to overcome a number of discrepancies that arise when configuring usage monitoring with respect to a session between a mobile or wireless device and the mobile access network to access one or more services. For example, in activating usage monitoring, a policy and charging rules function (PCRF) may provide incomplete activation information. Rather than discard this incomplete activation information, the PGW may configure but not activate usage monitoring for the session in the event information sufficient to complete the incomplete activation information is forthcoming.

As another example, in deactivating usage monitoring, a PCRF may deactivate usage monitoring in response to a usage report from the PGW providing the usage information. In this situation, rather than ignore the deactivation and continue to report usage information, the PGW may disable usage monitoring for the session without, as is common to the 3GPP specification, providing a usage report.

As yet another example, in installing a policy and charging control (PCC) rule, the PCRF may provide incomplete information to activate usage monitoring. Rather than install the rule without usage monitoring despite the discrepancy as to whether usage monitoring was intended to be activated or not, the PGW may reject the PCC rule while also possibly providing a result_code to enable the PCRF to evaluate the reason for which the rule was rejected. As such the foregoing techniques may overcome many ambiguities and discrepancies in PCRF/PGW interactions that may facilitate better operation of mobile access networks.

In one aspect, a method comprises establishing, by a mobile gateway positioned within a mobile access network, a session by which a mobile device accesses a service provided by the mobile access network, and in response to receiving an incomplete indication to activate usage monitoring of the service using the session, configuring at least a portion of the usage monitoring by the mobile gateway without activating the usage monitoring.

In another aspect, a mobile gateway comprises one or more processors configured to establish a session by which a mobile device accesses a service provided by a mobile access network, and in response to receiving an incomplete indication to activate usage monitoring of the service using the session, configuring at least a portion of the usage monitoring without activating the usage monitoring, and a memory configured to store the usage monitoring configuration.

In another aspect, a system comprises a mobile device, and a mobile gateway positioned in a mobile access network. The mobile gateway comprises one or more processors configured to establish a session by which a mobile device accesses a service provided by a mobile access network, and in response to receiving an incomplete indication to activate usage monitoring of the service using the session, configuring at least a portion of the usage monitoring without activating the usage monitoring, and a memory configured to store the usage monitoring configuration.

In another aspect, a non-transitory computer-readable storage medium has stored thereon instructions that, when executed, cause one or more processors of a mobile gateway to establish a session by which a mobile device accesses a service provided by a mobile access network in which the mobile gateway is positioned, and in response to receiving an incomplete indication to activate usage monitoring of the service using the session, configure at least a portion of the usage monitoring by the mobile gateway without activating the usage monitoring.

In another aspect, a method comprises transmitting, by a mobile gateway positioned within a mobile access network, a usage monitoring report indicative of usage by a mobile device of a service provided over a session for which usage monitoring was previously activated, receiving, by the mobile gateway and in response to transmitting the usage monitoring report, an indication to deactivate usage monitoring of the service for the session, and in response to the indication to deactivate the usage monitoring, removing a monitoring key that was configured as a part of activating the usage monitoring of the service for the session.

In another aspect, a mobile gateway comprises one or more processors configured to transmit a usage monitoring report indicative of usage by a mobile device of a service provided over a session for which usage monitoring was previously activated, and a memory configured to store a monitoring key that was configured as a result of activating the usage monitoring for the service. The one or more processors are also configured to receive, in response to transmitting the usage monitoring report, an indication to deactivate usage monitoring of the service for the session, and remove, in response to receiving an indication to deactivate the usage monitoring of the service for the session, the monitoring key that was configured as a part of activating the usage monitoring of the service for the session.

In another aspect, a system comprises a device that performs a policy and charging rules function, a mobile device, and a mobile gateway positioned in a mobile access network. The mobile gateway comprises one or more processors configured to transmit a usage monitoring report indicative of usage by a mobile device of a service provided over a session for which usage monitoring was previously activated, and a memory configured to store a monitoring key that was configured as a result of activating the usage monitoring for the service. The one or more processors are also configured to receive, in response to transmitting the usage monitoring report, an indication to deactivate usage monitoring of the service for the session, and remove, in response to receiving an indication to deactivate the usage monitoring of the service for the session, the monitoring key that was configured as a part of activating the usage monitoring of the service for the session.

In another aspect, a non-transitory computer-readable storage medium has stored thereon instructions that, when executed, cause one or more processors of a mobile gateway to transmit a usage monitoring report indicative of usage by a mobile device of a service provided over a session for which usage monitoring was previously activated, receive, in response to transmitting the usage monitoring report, an indication to deactivate usage monitoring of the service for the session, and in response to the indication to deactivate the usage monitoring, remove a monitoring key that was configured as a part of activating the usage monitoring of the service for the session.

In another aspect, a method comprises establishing, with a mobile gateway positioned in a mobile access network, a session by which a mobile device is to access a service, and in response to receiving an indication to activate a charging rule having an incomplete indication to activate usage monitoring with respect to the service provided via the session, rejecting the charging rule.

In another aspect, a mobile gateway comprises one or more processors configured to establish a session by which a mobile device is to access a service, and in response to receiving an indication to activate a charging rule having an incomplete indication to activate usage monitoring with respect to the service provided via the session, rejecting the charging rule.

In another aspect, a system comprises a mobile device, and a mobile gateway positioned in a mobile access network. The mobile gateway comprises one or more processors configured to establish a session by which the mobile device is to access a service, and in response to receiving an indication to activate a charging rule having an incomplete indication to activate usage monitoring with respect to the service provided via the session, reject the charging rule.

In another aspect, a non-transitory computer-readable storage medium has stored thereon instructions that, when executed, cause one or more processors of a mobile gateway to establish a session by which a mobile device is to access a service, and in response to receiving an indication to activate a charging rule having an incomplete indication to activate usage monitoring with respect to the service provided via the session, reject the charging rule.

The details of one or more embodiments of the techniques are set forth in the accompanying drawings and the description below. Other features, objects, and advantages of the techniques will be apparent from the description and drawings, and from the claims.

BRIEF DESCRIPTION OF DRAWINGS

Like reference characters denote like elements throughout the figures and text.

DETAILED DESCRIPTION

Figure 1:
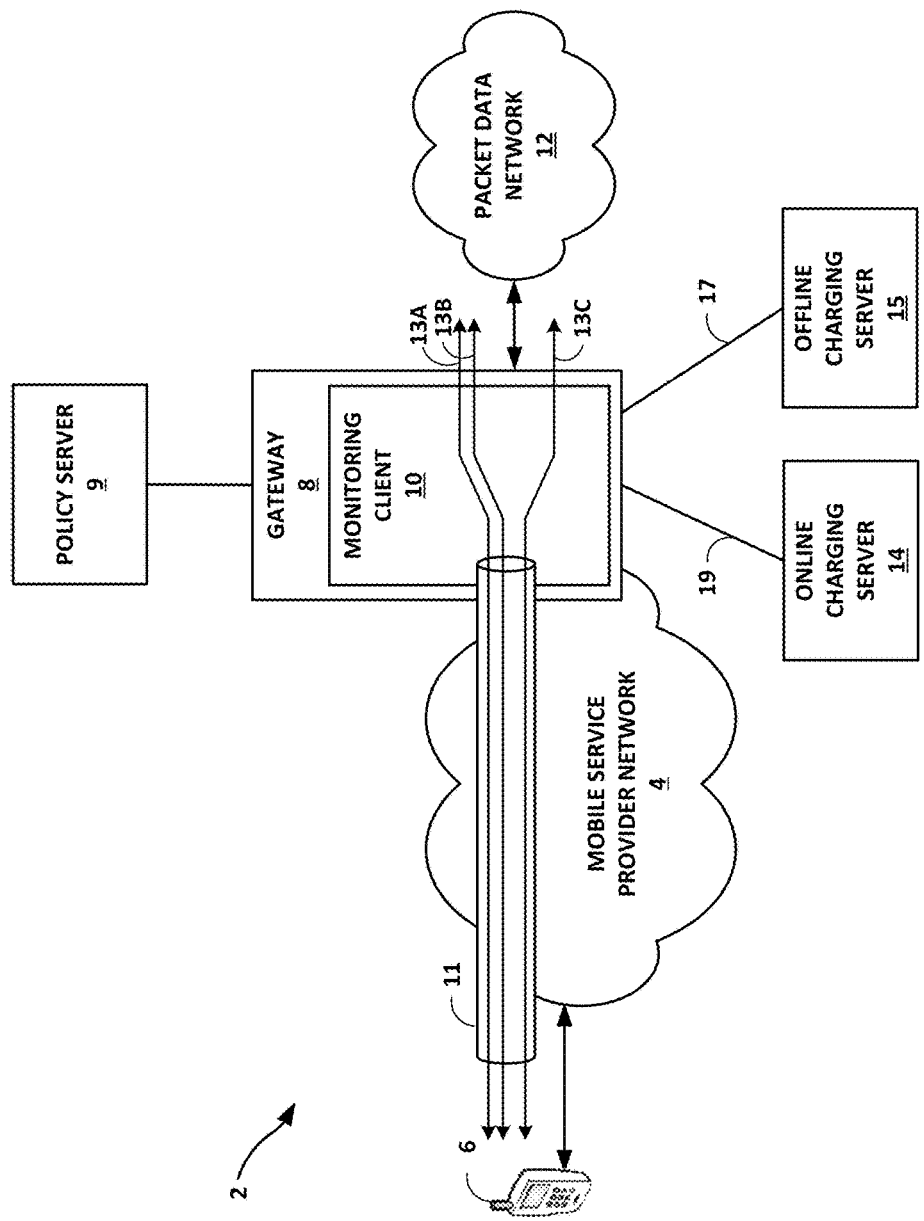
FIG. 1 is a block diagram illustrating an example network system that performs fine-grained charging control at the rating group level for multi-service subscriber sessions according to techniques described in this disclosure.

FIG. 1 is a block diagram illustrating an example network system that performs usage monitoring control according to techniques described in this disclosure. In this example, network system 2 includes packet data network (PDN) 12 coupled to mobile service provider network 4 ("mobile network 4") via gateway 8 of mobile network 4. Packet data network 12 supports one or more packet-based services that are available for request and use by wireless device 6. As examples, PDN 12 may provide, for example, bulk data delivery, voice over Internet protocol (VoIP), Internet Protocol television (IPTV), Short Messaging Service (SMS), Wireless Application Protocol (WAP) service, Session Initiation Protocol (SIP) services, or customer-specific application services. Packet data network 12 may comprise, for instance, a local area network (LAN), a wide area network (WAN), the Internet, a virtual LAN (VLAN), an enterprise LAN, a layer 3 virtual private network (VPN), an Internet Protocol (IP) intranet operated by the mobile service provider that operates mobile network 4, an enterprise IP network, or some combination thereof. In various instances, PDN 12 is connected to a public WAN, the Internet, or to other networks. Packet data network 12 executes one or more packet data protocols (PDPs), such as IP (IPv4 and/or IPv6), X.25 or Point-to-Point Protocol (PPP), to enable packet-based transport of PDN 12 services.

Wireless device 6 is a wireless computing device that may represent, for example, a mobile telephone, a laptop or desktop computer having, e.g., a 3G/4G wireless card or hub, wireless-capable netbook, video game device, pager, smart phone, a personal data assistant, or any combination of these items. Wireless device 6 may run one or more applications, such as VoIP clients, video games, videoconferencing, E-mail, and Internet browsers, among others. Certain applications running on wireless device 6 may require access to services offered by PDN 12. Wireless device 6 may also be referred to, in various architectural embodiments for example, as User Equipment (UE), a Mobile Station (MS), a subscriber device, or a mobile device.

A mobile service provider operates mobile network 4 to provide network access, data transport and other services to wireless device 6. In general, mobile network 4 may implement any commonly defined cellular network architecture including those defined by standards bodies, such as a Global System for Mobile communication (GSM) Association, a $3^{rd}$ Generation Partnership Project (3GPP), a $3^{rd}$ Generation Partnership Project 2 (3GGP/2), an Internet Engineering Task Force (IETF) and a Worldwide Interoperability for Microwave Access (WiMAX) forum. For example, mobile network 4 may implement one or more of a GSM architecture, a General Packet Radio Service (GPRS) architecture, a Universal Mobile Telecommunications System (UMTS) architecture, and an evolution of UMTS referred to as Long Term Evolution (LTE), each of which are standardized by 3GGP. Mobile network 4 may, alternatively or in conjunction with one of the above, implement a code division multiple access-2000 ("CDMA2000") architecture. Mobile network 4 may, again as an alternative or in conjunction with one or more of the above, implement a WiMAX architecture defined by the WiMAX forum.

Mobile network 4 may include a core packet-switched network (not shown in FIG. 1) and one or more radio access networks (also not shown in FIG. 1). A core packet-switched network of mobile network 4 may comprise, for example, a GPRS core packet-switched network, an IP-based mobile multimedia core network, or an Evolved Packet Core (EPC). Wireless device 6 communicates with mobile network 4 using a wireless communication link to one of the radio access networks of the mobile network. Radio access networks of mobile network 4 may include, for example, for example, a GSM Radio Access Network (GRAN), a WiMAX radio access network, a UMTS Radio Access Network (UTRAN), and/or an evolution of a UTRAN known as an E-UTRAN. Mobile network 4 may further include a backhaul or transport network (not shown) that includes land-based transmission lines, frequently leased by a service provider for the mobile network, to transport user and control traffic between wireless device 6 and gateway 8. The backhaul network also includes network devices such as aggregation devices and routers.

Gateway 8 is a network device that operates as a gateway to PDN 12 and may represent, for example, a Gateway GPRS Serving Node (GGSN), an Access Gateway (aGW), a Packet Gateway (P-GW), or any combination of the above. Gateway 8 may comprise a router. While described herein with respect to one or more particular architectures for ease of illustration purposes, mobile network 4 may implement any architecture including those set forth by any standards body and those proprietarily owned. Moreover, the techniques may apply to any mobile data protocol supported by these architectures. The techniques therefore should not be limited to cellular architectures referenced to herein and the mobile data protocols supported by these architectures. Gateway 8 and other elements of mobile network 4 may, therefore, each represent an abstraction of devices found within any type of mobile network architectures.

Mobile network 4 establishes and operates bearers to transport user traffic, in the form of PDP packet data units (PDUs), referred to hereinafter as "packets." In general, a bearer is a set of network resources and data transport functions in mobile network 4 to deliver user traffic between two network entities. A bearer may include a path, a logical connection, or a physical or wireless connection between two network devices. A bearer may comprise, for example, an Evolved Packet System (EPS) bearer. Further details regarding bearer setup and management are found in "3GPP TS 23.401—General Packet Radio Service (GPRS) enhancements for Evolved Universal Terrestrial Radio Access Network," version 10.0.0, 3rd Generation Partnership Project, Technical Specification Group Services and System Aspects, June 2010, and 3GPP TS 36.300—Evolved Universal Terrestrial Radio Access (E-UTRA) and Evolved Universal Terrestrial Radio Access Network Evolved Universal Terrestrial Radio Access Network (E-UTRAN) Overall Description," Release 10, 3rd Generation Partnership Project, Technical Specification Group Radio Access Network, 2010, the entire contents of each being incorporated herein by reference.

Wireless device 6 attaches to mobile network 4, which establishes a subscriber session typically including a default bearer to carry user traffic for the wireless device as part of an attach procedure. The subscriber session is an association between mobile network 4 and wireless device 6 that is identifiable by a combination of a wireless device 6 PDP address and an Access Point Name (APN) or other PDN identifier for PDN 12. In instances of mobile service provider network 4 that include an IP-based connectivity access network (IP-CAN), a subscriber session represents an IP-CAN session. A subscriber session may represent and alternatively be referred to as a PDP context.

Besides establishing a default bearer, the attach procedure may trigger establishment, by mobile network 4, of one or more dedicated bearers between gateway 8 and wireless device 6 to carry user traffic for the subscriber session. Dedicated bearers operate according to a different set of quality of service (QoS) parameters and thus provide QoS differentiation to packet flows of various services engaged by wireless device 6. For example, various dedicated bearers may provide different guaranteed bit rates (GBR bearers) (or may not provide a guaranteed bit rate), maximum bit rates (MBRs), priority, packet delay budget, packet error loss rate, and allocation and retention priority (ARP) characteristics. A particular bearer may transport packet flows for multiple services of a subscriber session when the QoS characteristics of the bearer match the requirements of the services.

Gateway 8 includes monitoring client 10 that implements charging control for mobile network 4. Monitoring client 10 may, for instance, implement a Policy and Charging Enforcement Function (PCEF), which provides service data flow detection, user plane traffic handling, triggering control plane session management in some instances, QoS handling, and service data flow measurement as well as online and offline charging interactions with online charging server 14 and offline charging server 15. In some examples, monitoring client 10 provides policy and charging control (PCC) functionality. In such examples, an operator and/or an external entity, such as a Policy and Charging Rules Function (PCRF) entity (not shown in FIG. 1), provisions monitoring client 10 with one or more PCC rules that each specify a set of information enabling the detection of a service data flow and providing policy control and/or charging control parameters. Monitoring client 10 then enforces service flow-based policy and charging control according to the PCC rules. Further example details regarding policy and charging control are found in "3GPP TS 23.203," incorporated above, as well as in U.S. patent application Ser. No. 12/947,463, filed Nov. 16, 2010, which is incorporated by reference herein in its entirety.

To facilitate offline charging, gateway 8 exchanges communications with offline charging server 15 by interface 17, which may implement a Ga reference point and may include a communication link. With offline charging, offline charging server 15 collects charging information for network resource usage from gateway 8 and, in some cases, other elements of mobile service provider network 4 concurrently with that resource usage. In this sense, gateway 8 (more particularly monitoring client 10) may provide an offline charging data function (CDF) for network system 2 and offline charging server 15 may provide a charging gateway function (CGF).

To facilitate online charging, gateway 8 exchanges communications with online charging server 14 by interface 19, which may implement a Gy/Ro reference point and may include a communication link. Online charging server 14 may include a Remote Authentication Dial-In User Service (RADIUS) server and may provide real-time credit control by performing transaction handling, rating, and online correlation and management of subscriber accounts for mobile network 4. For example, monitoring client 10 collects charging information, e.g., chargeable events and requested network resource usage, and forwards the charging information to online charging server 14 providing the online charging function (OCF) in order to obtain authorization to provide the requested resources or chargeable events. In this way, monitoring client 10 may provide an online charging trigger function (OTF). Additional details regarding online and offline charging may be found in TS 32.240 and TS 32.299, each of which is incorporated by reference, as noted above, in their respective entireties.

In the example of FIG. 1, mobile service provider network 4 establishes bearer 11 for a subscriber session for wireless device 6. Bearer 11 may represent a default or dedicated bearer. Mobile service provider network 4 maps packets associated with any of multiple services 13A-13C (collectively, "services 13") to bearer 11, which mobile service provider network 4 uses to transport the mapped packets in the downlink direction from gateway 8 toward wireless device 6 and in the uplink direction from wireless device 6 to gateway 8. Each of services 13 may represent, e.g., conversation voice or video, real-time gaming, buffered streaming, Transmission Control Protocol (TCP)-based services (such as Internet access, HTTP-service, e-mail, chat, File Transfer Protocol (FTP), and Peer-to-Peer (P2P) services), IP Multimedia Subsystem (IMS) signaling, and so forth. Packets associated with service 13A may, for example, constitute one or more packet flows that match a service data flow (SDF) filter of an SDF template for the service.

Within the context of policy and charging control resides usage monitoring in which, as one example, the PCRF may indicate, via the Gx reference point, that monitoring control is required for the accumulated usage of network resources on a session-by-session basis. Usage may be defined as volume or time of user plane traffic. Monitoring of both traffic volume and traffic time may occur concurrent to one another. In some instances, the data collection for usage monitoring control is performed per monitoring key, where a monitoring key may be defined for a single service data flow, a set of service data flows, or for all the traffic in a session.

In other words, the PCRF may apply usage monitoring for the accumulated usage of network resources on a CAN session and user basis. Usage monitoring may be required of reinforcing dynamic policy decisions based on the total network usage in real-time. The PCRF that uses usage monitoring for making dynamic policy decisions may set and send the applicable thresholds to monitoring client 10, which may represent one or both of the PCEF and a traffic detection function (TDF). Monitoring client 10 may, more generally, represent any unit configured to monitor usage and notify the PCRF when a threshold (defined, as one example, in terms of volume) is reached and report the accumulated usage since the last report for usage monitoring.

The PCRF may enable usage monitoring in a number of ways. When establishing an IP-CAN session, the PCRF may enable usage monitoring in response to an initial credit control request (CCR-I) message from monitoring client 10 by sending an initial credit control answer (CCA-I) message that specifies the monitoring key for each data set (which may refer to a portion of a session that delivers a particular service) for which the PCRF wants to enable usage monitoring. The PCRF may provide the monitoring key in a Monitoring-Key attribute-value pair (AVP) for a particular PCC rule to enable usage monitoring for the corresponding service to which the PCC rule applies. The PCC rule, in other words, may include service data flow (SDF) information that allows for identification of IP traffic, charging parameters used to charge this traffic, and quality of service (QoS) parameters to be applied to the traffic that the SDF filters identify. The Monitoring-Key AVP may identify this PCC rule, thereby informing monitoring client 10 that the usage monitoring has been enabled for the corresponding SDF filters. In some instances, the PCRF may enable usage monitoring for the entire session (and not just a service provided via the session or a portion of the session) by sending this CCA-I without the Monitoring-Key AVP.

The PCRF may request that monitoring client 10 report usage by including a Usage-Monitoring-Report AVP (in the Usage-Monitoring-Information AVP) having a value set to "USAGE_MONITORING_REPORT_REQUIRED" in the CCA-U message. The PCRF may indicate that the PCC rules are to be installed by sending a Charging-Rule-Install AVP. The Charging-Rule-Name AVP and a Monitoring-Key AVP that corresponds to the monitoring key are specified in the Usage-Monitoring-Information AVP.

The PCRF may further install rules using a re-authorization request (RAR) message and request usage monitoring for those rules. These PCC rules may be statically defined at monitoring client 10 or dynamically defined and provided to monitoring client 10. In any event, the RAR message may include, when monitoring is requested for a PCC rule, a Usage-Monitoring-Information AVP for each monitoring key, and the desired threshold levels (for specifying when to report usage information, as discussed in more detail below) may be provided in a Granted-Service-Unit AVP. The RAR Usage-Monitoring-Information AVP may include a Monitoring-Key AVP specifying the monitoring key associated with the PCC rule being installed and the Granted-Service-Unit AVP with a CC-Total-Octets AVP stating the total number of requested, granted or used octets regardless of direction, a CC-Input-Octets AVP stating the number of requested, ranged or used octets that can be/have been received from the end user, a CC-Output-Octets AVP providing a number of requested, granted or used octets that can be/have been sent to the end user, a Usage-Monitoring-Level AVP set to "PCC-RULE_LEVEL." As with the CCA-I message above, the PCRF may indicate that the PCC rule is to be installed by sending a Charging-Rule-Install AVP that includes a Charging-Rule-Name AVP and a Monitoring-Key AVP that corresponds to the monitoring key specified in the Usage-Monitoring-Information AVP.

The PCRF may also remove PCC rules for which usage monitoring may have been enabled. A PCC rule installed via the RAR/RAA (re-authorization answer) message exchange may also be removed, which may trigger an update request from monitoring client 10 that involves monitoring client 10 reporting the accumulated usage information. In other words, when the PCRF removes a rule via a RAR message, the PCRF is also disabling any usage monitoring associated with that rule. Monitoring client 10 may send an update CCR (CCR-U) message with a CC-Request-Type AVP set to "UPDATE_REQUEST" and an Event-Trigger AVP set to "USAGE_REPORT" to report accumulated usage for the now disabled one or more usage monitoring keys.

The PCRF may, in other words, configure an Event Reporting Function (ERF) executed by monitoring client 10 using such Event-Triggers. The ERF performs event trigger detection. When an event matching the event trigger occurs the ERF reports the occurred event to the PCRF. The event triggers define the conditions when the ERF is to interact again with the PCRF after IP-CAN session establishment. The PCRF may subscribe to some event triggers (e.g., those that are not necessarily required for proper delivery and maintenance of services). While the foregoing relate to installing an Event-Trigger AVP to configure usage monitoring upon reaching some event trigger, monitoring client 10 may send update requests via CCR-U/CCA-U message exchanges independent of usage monitoring and reporting.

Additionally, when an IP-CAN session is terminated, monitoring client 10 may report accumulated usage for a specific monitoring key by sending a termination CCR (CCR-T) message. The CCR-T message may include the Usage-Monitoring-Information AVP that includes a Monitoring-Key AVP and the accumulated usage since the last report in the form of a Used-Service-Unit AVP that includes a CC-Total-Octets AVP, a CC-Input-Octets AVP and a CC-Output-Octets AVP.

In some instances, the PCRF may provide the Usage-Monitoring-Information AVP along with an Event-Trigger AVP having the value set to "USAGE_REPORT" when the PCRF is not currently subscribed to this "USAGE_REPORT" Event-Trigger AVP. When the Event-Trigger AVP having a value set to "USAGE_REPORT" has already been sent or provided to the monitoring client 10 (or, in other words, when the PCRF has previously subscribed to the "USAGE_REPORT" Event-Trigger for the current session), the PCRF may send only the Usage-Monitoring-Information AVP without including the Event-Trigger AVP having the value set to "USAGE_REPORT."

Moreover, although described above as explicitly indicating when usage monitoring is to be enabled, the PCRF may also install PCC rules that activate or otherwise enable usage monitoring. That is, the PCRF may dynamically create and then send a Charging-Rule-Definition AVP to monitoring client 10 that includes a Monitoring-Key AVP along with the Usage-Monitoring-Information AVP as described above. Monitoring client 10 may then install this dynamically created PCC rule. In other instances, monitoring client 10 may be statically configured with PCC rules and the PCRF may indicate that one or more of these statically configured rules are to be installed. In the context of usage monitoring, the PCRF may send a Charging-Rule-Install AVP to install a predefined rule, where this predefined rule is configured with a Monitoring-Key AVP and the corresponding Usage-Monitoring-Information AVP. Monitoring client 10 may, in response to receiving this Charging-Rule-Install AVP, install the rule and thereby activate usage monitoring.

Once usage monitoring is enabled, the PCRF may explicitly disable usage monitoring as a result of receiving a credit control request (CCR) from the traffic detection function (as, for example, executed by gateway 8 within or separate from monitoring client 10 but not explicitly shown in FIG. 1 for ease of illustration purposes), where the CCR is not related to reporting usage, but related to other external triggers (e.g., a subscriber profile update). CCR messages, CCA messages, RAR messages and RAA messages are described in more detail in a request for comments (RFC) 4006, entitled "Diameter Credit-Control Application," dated August 2005, and available at: http://www.ietf.org/rfc/rfc4006.txt, the entire contents of which are hereby incorporated by reference as if set forth fully herein. The PCRF may also explicitly disable usage monitoring in response to an internal trigger. To disable monitoring for a monitoring key, the PCRF may send the Usage-Monitoring-Information AVP including only the applicable monitoring key within the Monitoring-Key AVP and the usage-Monitoring-Support AVP set to "USAGE_MONITORING_DISABLED."

In this respect, the 3GPP TS 29.212 standard provides for a number of different ways by which to activate or otherwise enable usage monitoring for purposes of policy and charging control. Likewise, the 3GPP TS 29.212 standard provides a number of different ways by which to deactivate or otherwise disable usage monitoring. However, discrepancies exist in various usage monitoring activation and deactivation scenarios that may result in mobile session disruptions and/or inaccurate usage monitoring.

For example, the 3GPP TS 29.212 standard does not address various instances where the PCRF or operator provides an incomplete indication to activate usage monitoring with respect to a service provided via a session (e.g., one of services 13) to monitoring client 10. To illustrate, the 3GPP TS 29.212 standard does not specify during non-PCC rule-based activation of usage monitoring how monitoring client 10 is to operate when the PCRF sends a Usage-Monitoring-Information AVP to activate usage monitoring for a service (identified via a SDF) provided via a session in which an Event-Trigger AVP having a value set to "USAGE_REPORT" has not previously been established for this SDF or sent along with the Usage-Monitoring-Information AVP. In this respect, the indication to activate usage monitoring is incomplete, given that the appropriate Event-Trigger AVP has not been specified.

As another illustration, the 3GPP TS 29.212 standard does not define how monitoring client 10 is to operate when the PCRF attempts to install a dynamic rule via a Charging-Rule-Definition AVP accompanied by a Monitoring-Key AVP within monitoring client 10 in the case where a Usage-Monitoring-Information AVP has not been previously defined for the service provided via the session to be monitored or provided along with the Monitoring-Key AVP and Charging-Rule-Definition AVP. Again, the indication to activate usage monitoring is incomplete. This same incomplete indication to activate usage monitoring also extends to the context of the pre-defined rule, where rules are statically defined within monitoring client 10 and then installed per an indication from the PCRF. In other words, the 3GPP TS 29.212 standard does not define how monitoring client 10 is to operate when the PCRF sends a Charging-Rule-Install AVP for a predefined rule which is configured with a Monitoring-Key AVP but not with the Usage-Monitoring-Information AVP.

The foregoing instances relate to usage monitoring activation, but similar discrepancies may exist in the context of usage monitoring deactivation. For example, while the 3GPP TS 29.212 standard defines how the PCRF and monitoring client 10 are to operate when disabling usage monitoring in response to monitoring client 10 sending a CCR not related to usage reporting, the 3GPP TS 29.212 standard does not specify how monitoring client 10 is to operate when monitoring client 10 sends a CCR related to usage reporting and the PCRF responds to this CCR related to usage reporting with an indication to disable usage reporting (or, more specifically, a Monitoring-Key AVP associated with the service provided via the session for which the CCR was reporting usage). All of the foregoing discrepancies may lead to mobile session disruptions and/or inaccurate usage monitoring given that different monitoring clients may operate in unpredictable ways that cause these disruptions or monitoring inaccuracies.

In accordance with various techniques of this disclosure, monitoring client 10 may establish a session, e.g., one of sessions 13, by which mobile device 6 is to access a service. In response to receiving an incomplete indication to activate usage monitoring with respect to the service provided via the session, monitoring client 10 may configure the usage monitoring without activating the usage monitoring. In other words, when monitoring client 10 receives only a Usage-Monitoring-Information AVP (in a CCA/RAR) on a session which had potentially never received an Event-Trigger AVP set to "USAGE_REPORT" (including in this current message), then monitoring client 10 may store the received Usage-Monitoring-Information (UMI) AVP, but will not activate the received Usage-Monitoring-Information AVP. In this instance, it may be assumed that the PCRF is aware that if it sends the UMI AVPs without corresponding Event-Trigger AVPs, monitoring client 10 will likely not perform any usage monitoring. If at any time monitoring client 10 receives an Event-trigger AVP value set to "USAGE_REPORT" for the corresponding session, monitoring client 10 may activate all the stored Usage-Monitoring-Information objects and begin monitoring the corresponding session/flow. When the monitoring client 10 receives an Event-Trigger AVP value set to "NO_EVENT_TRIGGERS" when monitoring client 10 is doing active monitoring, monitoring client 10 may report the accumulated usage and cleanup all the monitoring keys.

In accordance with various techniques of this disclosure, monitoring client 10 may transmit a usage monitoring report indicative of usage of a service for which usage monitoring was previously activated and receive, in response to the usage monitoring report, an indication to deactivate usage monitoring for the service in the manner described above. In response to the indication to deactivate the usage monitoring, monitoring client 10 may remove any monitoring keys that were configured as a result of activating the usage monitoring.

In other words, when the PCRF deletes a usage-monitoring object in response to a CCR-U with Event-trigger set to "USAGE_REPORT" by sending USAGE_MONITORING_DISABLED with a Usage-Monitoring-Support AVP, the action defined in monitoring client 10 is as follows:

Cleanup the monitoring keys implicitly (irrespective of whether the object had hit threshold earlier while sending CCR-U or not).

Monitoring client 10 may not send any usage-report for these objects to PCRF.

Monitoring client 10 is doing the implicit delete because the PCRF had received the report in this CCR-U only (whose CCA-U PCRF disabled usage monitoring), so the PCRF likely does not need the report again.

In accordance with various techniques of this disclosure, monitoring client 10 may establish a session by which a mobile device 6 is to access a service in the manner noted above. In response to receiving an indication to activate a charging rule having an incomplete indication to activate usage monitoring with respect to the service provided via the session, monitoring client 10 may reject the charging rule. In other words, when monitoring client 10 receives the dynamic rule from PCRF via a Charging-Rule-Definition AVP along with a Monitoring-Key AVP but without the Usage-Monitoring-Information with same Monitoring-Key AVP or monitoring client 10 had not received the Usage-Monitoring-Information AVP earlier (through earlier RAR/CCA messages), then monitoring client 10 may reject the rule. Monitoring client 10 may also send a CCR-U with Charging-Rule-Report AVP. Monitoring client 10 may reject the rule irrespective of whether monitoring client 10 had received an Event-Trigger AVP set to 'USAGE_REPORT' or not. Monitoring client 10 may add a new result_code in the CCR-U to indicate this error.

Moreover, when monitoring client 10 receives a Charging-Rule-Install AVP for a predefined rule (e.g., PCRF activates a predefined rule), where the rule is configured with a Monitoring-Key AVP and the received message does not include the Usage-Monitoring-Information AVP with a same Monitoring-Key or the TDF had not received the Usage-Monitoring-Information AVP earlier (through earlier RAR/CCA messages), monitoring client 10 may reject the rule. As noted above, monitoring client 10 may send a CCR-U with a Charging-Rule-Report AVP. Monitoring client 10 may reject the rule irrespective of whether monitoring client 10 had received an Event-Trigger AVP set to 'USAGE_REPORT' or not. Monitoring client 10 may add a new result_code in the CCR-U to indicate this error.

While described with respect to a service provided via the session, the techniques may be performed in instances where monitoring is enabled with respect to the entire session (e.g., when the Monitoring-Key AVP is omitted from the CCR/CCA message exchange). That is, when usage monitoring is activated for the entire session, the usage monitoring is effectively enabled for each service provided via the session whether there is one service or a plurality of services provided via the session. As a result, when usage monitoring is enabled for a session, it should be understood that usage monitoring is performed for a service of the session. Accordingly, the techniques may be performed both when usage monitoring is activated for a service provided via a session, one of a plurality of services provided via the session, or the entire session.

Figure 2:
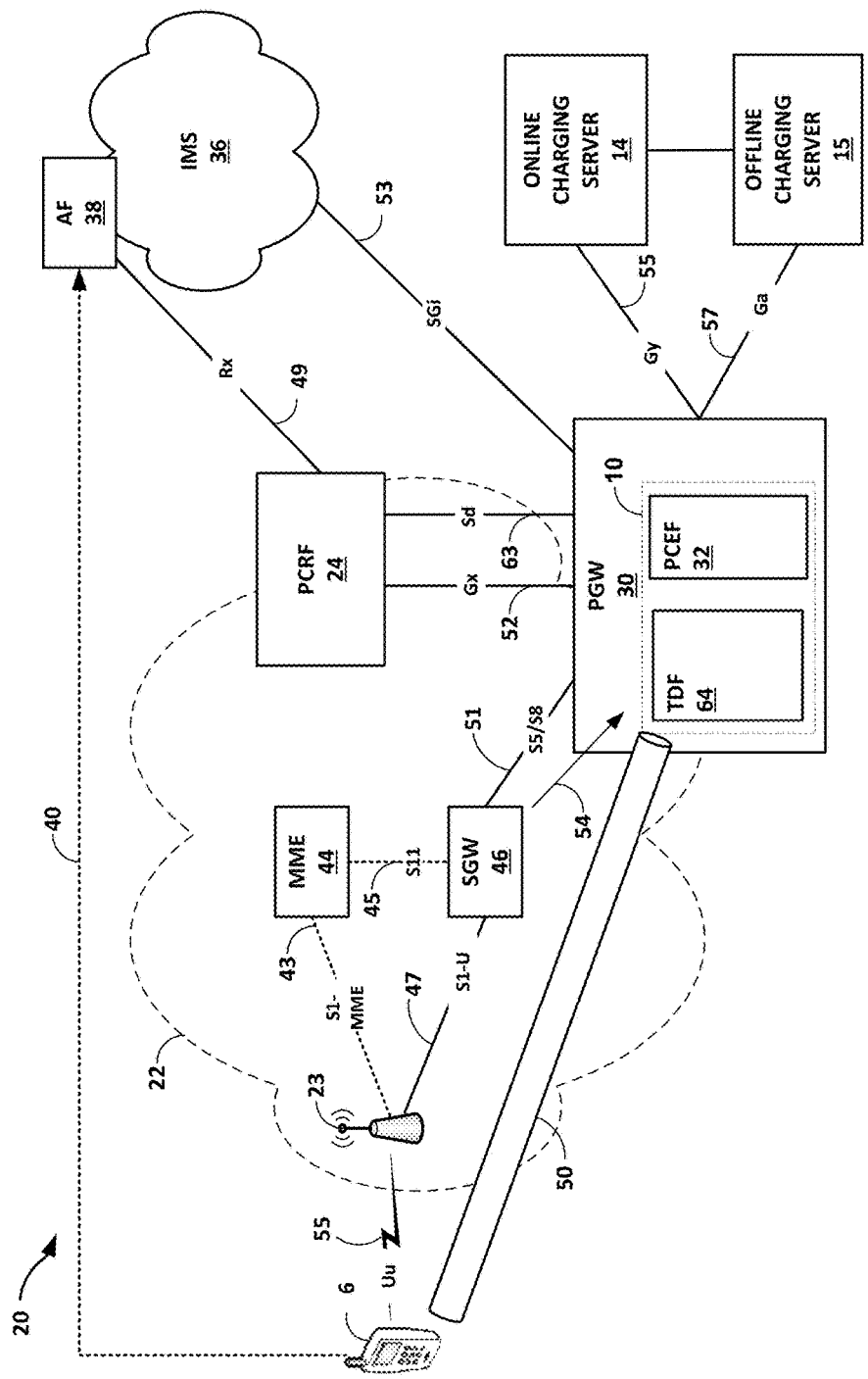
FIG. 2 is a block diagram illustrating an example network system that performs the usage monitoring control techniques described in this disclosure.

FIG. 2 is a block diagram illustrating an example network system 20 that performs the usage monitoring control techniques described in this disclosure. Network system 20 may represent an example instance of network system 2 of FIG. 1. Network system 20 includes a Long Term Evolution (LTE) mobile service provider network 22 ("mobile network 22") that includes an Evolved Packet Core (EPC) interfaced to an Evolved UTRAN (E-UTRAN) 23. Mobile network 22 enables and transports service data exchanged between wireless device 6 and packet data networks, such as IP Multimedia Subsystem (IMS) network 36. IMS 36 may represent an example of PDN 12 of FIG. 1. Mobile network 22 may represent an embodiment of mobile service provider network 4 of FIG. 1.

Mobile network 22 provides mobility management, session management, and packet routing and transfer for network system 20. The mobile network 22 EPC comprises PDN Gateway 30 ("PGW 30") logically connected to Serving Gateway 46 ("SGW 46") via S5/S8 interface 51 operating over a communication link. PGW 30 hosts packet filtering, lawful interception, PDP address allocation, and other functionality. PGW 30 may implement an edge router between mobile network 22 and external PDNs, e.g., IMS 36. As described in additional detail below, PGW 30 comprises Policy and Charging Enforcement Function (PCEF) 32 to perform packet gating, filtering, and charging control.

PGW 30 may represent an example instance of gateway 8 of FIG. 1. S5/S8 interface 51 provides protocols to foster user plane tunneling and tunnel management between PGW 30 and SGW 46. S5/S8 interface 51 may comprise a user plane protocol stack that includes GPRS Tunneling Protocol-User Plane (GTP-U) executing over User Datagram Protocol/Internet Protocol (UDP/IP). The term "communication link," as used herein, comprises any form of transport medium, wired or wireless, and can include intermediate nodes such as network devices. SGW 46 hosts mobility anchoring, packet routing and forwarding, lawful interception, and other functionality.

The mobile network 22 additionally includes Mobility Management Entity 44 ("MME 44") logically connected to SGW 46 via S11 interface 45 operating over a communication link. S11 interface 45 provides protocols with which MME 44 establishes and manages bearers that traverse or terminate at SGW 46. S11 interface 45 may comprise a control plane protocol stack that includes GTP-Control Plane (GTP-C) executing over UDP/IP. In addition to bearer management and establishment, MME 44 hosts Non-Access Stratum (NAS) signaling, PDN 30 and SGW 46 selection, roaming, and authentication, for instance. In various embodiments, mobile network 22 comprises additional MMEs, SGWs, and/or PGWs.

SGW 46 and MME 44 connect to E-UTRAN 23 via respective aspects of an S1 interface. Specifically, SGW 46 logically connects to individual E-UTRAN 23 via S1-U interface 47 operating over a communication link. MME 44 logically connects to individual E-UTRAN 23 via S1-MME interface 43 operating over a communication link to establish bearers over S1-U interface 47 between SGW 46 and E-UTRAN 23. E-UTRAN 23 comprises one or more eNode Bs. E-UTRAN 23 is communicatively coupled to wireless device 6 (which is an example of a mobile device) via a radio link operating over Uu interface 55.

Wireless device 6, which represents an instance of wireless device 6 of FIG. 1, is a User Equipment (UE) that attaches to mobile network 22 to receive services during an attachment session identifiable by a combination of a wireless device 6 PDP address and an IMS 36 APN. Applications executing on wireless device 6 issues resource requests 40 to application function 38 to initiate service sessions for corresponding services. Resource requests 40 are application-layer signaling messages Network 20 additionally includes IP Multimedia Subsystem 36 ("IMS 36"), an operator service that the operator of mobile network 22 may use to provide services using, for example, the Session Initiation Protocol (SIP). In some aspects, IMS 36 represents one or more other instances of the services layer that provides services to devices, including wireless devices, attached to respective connectivity access networks, such as mobile network 22. For example, IMS 36 may represent non-IMS based operator services operating according to other standard or proprietary protocols. As another example, IMS 36 may represent services not provided by the operator of mobile network 22 and instead provided, for instance, via the Internet or another packet data network.

IMS 36 comprises application function 38 ("AF 38"), an IMS 36 element that offers applications requiring dynamic policy and/or charging with control over service data traffic that traverses mobile network 22. Application function 38 is communicatively coupled to Policy Control and Charging Rules Function entity 24 ("PCRF 24") via Rx interface 49. Application function 38 receives resource requests 40, which each comprise a request for a different service session, such as an IMS voice call, from wireless device 6. Application function 38 extracts service session description information from resource requests 40 and provides service session description information, such as Session Description Protocol (SDP) parameters, to PCRF 24 in service session description messages 49 sent over Rx interface 49. A service session may be alternatively referred to as an AF session or application session.

PCRF 24 provides network control for mobile network 22 by way of service data flow (SDF) detection, QoS, gating and packet flow-based charging. PCRF 24 receives service session description information for service sessions in service session description messages 49, calculates the proper QoS authorization, and generates new (and/or modifies existing) PCC rules that determine treatment of matching service data flows in Policy Charging and Enforcement Function entity 32 ("PCEF 32") and other components of mobile network 22. PCRF 24 installs the new (and/or modified) PCC rules for service sessions to PCEF 32 using PCC rule installation messages sent over Gx interface 52, a reference point between PCRF 24 and PCEF 32 that enables signaling of PCC rules. In the context of PCRF 24 generating and installing new PCC rules, these PCC rules may be referred to as "dynamic charging rules" given that PCRF 24 may dynamically generate and install the PCC rules. PCC rule installation messages may therefore include messages that include Charging-Rule-Definition attribute-value pairs (AVPs) that enable PCEF 32 to install the dynamic charging rules (which may also be referred to as "dynamic PCC rules"). PCRF 24 may also initiate the installation of pre-defined charging rules (which may be referred to as "pre-defined PCC rules"). In this respect, PCC rule installation messages may also represent messages having Charging-Rule-Install AVPs.

Gx interface 52 executes a communication protocol that may comprise, for example, Remote Authentication Dial-In User Service (RADIUS) or Diameter. PCRF 24 may be implemented within a router and, in various embodiments, mobile network 22 may comprise multiple PCRFs interconnected to multiple PGWs. In some instances, PCRF 24 receives service session information from PCEF 32, a Subscription Profile Repository (SPR), or a Bearer Binding and Event Reporting Function (BBERF) entity in addition to, or instead of, from AF 38.

PCEF 32 is a packet management entity of PGW 30 that performs service data flow detection, policy enforcement and flow based charging. PCEF 32 receives dynamic PCC rules determined by PCRF 24 for service sessions in PCC rule installation messages via Gx interface 52. In some instances, an operator provisions PCEF 32 with pre-defined/static PCC rules created and configured by the operator, which PCRF 24 may install via the above noted Charging-Rule-Install AVP.

Upon receiving dynamic PCC rules or in response to installing predefined PCC rules for corresponding service sessions, PCEF 24 initiates establishment of new bearers, or modification or utilization of existing bearers and binds the bearers to the PCC rules. As a result, PCEF 32 causes PGW 30 to transport inbound packets that match service data flow templates of any of the PCC rules using the respective bearer to which the PCC rule is bound. PCEF 32 may bind multiple PCC rules to a single bearer.

In the illustrated embodiment, PCEF 32 upon receiving PCC rules in PCC rule installation messages initiates establishment, within mobile network 22, of bearer 50 for the wireless device 6 session for transporting service data flows between wireless device 6 and IMS 36 by way of PGW 30. Bearer 50 may represent an EPS bearer or other 3GPP bearer. Charging control information in the PCC rules identify service data flows and specify parameters for charging control. The PCC rule policy and charging control information may depend on subscription information such as subscriber profiles configured within PGW 30 and associated with subscriber sessions for the subscriber, as described in further detail with respect to FIG. 3. PCEF 32 binds each of the received PCC rules generated for bearer 50 according to the policy control information specified within the respective PCC rules, and PCEF 32 performs charging control with respect to bearer 50 service data traffic according to charging control information included in the PCC rules and subscription information received and stored by PGW 30.

PCRF 24 may also communicate, via an Sd interface 63, with a traffic detection function (TDF) 64 executed or otherwise performed by PGW 30. TDF 64 may perform a traffic detection function in accordance with, as one example, the 3GPP Specification 29.212 and other 3GPP Specification noted above. PCRF 24 may communicate Application Detection and Control (ADC) rule installation messages via the Sd interface. These ADC rule installation messages may be similar and potentially substantially similar to the PCC rule installation messages described above with respect to the Gx interface 52, except that these rules may relate layer-4 and above application detection. These ADC messages may include similar AVPs as the PCC rule installation messages described above but may identify services at layer 4 and above (e.g., including layer-7 application detection). As such, Sd interface 63 may, similar to the Gx interface, execute a communication protocol that may comprise, for example, Remote Authentication Dial-In User Service (RADIUS) or Diameter.

In accordance with various techniques of this disclosure, PGW 30 may establish a session, e.g., one of sessions 50, by which wireless device 6 is to access a service. In response to receiving an incomplete indication to activate usage monitoring with respect to the session, PGW 30 may configure the usage monitoring without activating the usage monitoring. More specifically, as shown in the example of FIG. 2, PGW 30 may include monitoring client 10. Monitoring client 10 may perform PCEF 32, TDF 64, or both PCEF 32 and TDF 64, usage monitoring control in accordance with various aspects of the techniques described in this disclosure. Although monitoring client 10 is shown in the example of FIG. 2 as including both PCEF 32 and TDF 64, the techniques may be applied with respect to a monitoring client 10 that includes only PCEF 32, only TDF 64, or both PCEF 32 and TDF 64.

PGW 30 may generally establish bearer 50 with wireless device 6, invoking monitoring client 10 to establish PCC/ADC rules either dynamically or through installation of pre-defined PCC/ADC rules. PGW 30 may also alter existing rules by, at least in part, exchanging one or a series of messages (e.g., CCR-U/CCA-U messages that conform to the Diameter protocol), invoking monitoring client 10 to coordinate usage monitoring of one or more services provided via the session, e.g., one of bearers 50. Monitoring client 10 may determine various ones of the discrepancies noted above in either activating or deactivating usage monitoring. Monitoring client 10 may alternatively be executed by a service control gateway (SCG), which may be logically executed within PGW 30 or operate as a separate device or node within the network (the latter of which is described in more detail with respect to the example of FIG. 7).

For example, Monitoring client 10 may determine that the mobile gateway has received the incomplete indication to activate the usage monitoring upon receiving a message having a Usage-Monitoring-Information AVP for session 50 without having received, via either a previous message or the message including the Usage-Monitoring-Information AVP, an Event-Trigger AVP with a value of "USAGE_REPORT" for the session. Upon detecting this discrepancy, monitoring client 10 may configure usage monitoring (which may involve provisioning the various usage monitoring objects) but not activate usage monitoring (which may involve setting the appropriate Event-Trigger to actually enable processing of network traffic via bearer 50 to accumulate usage information). The message or messages by which these AVPs may be provided may include one of a credit control request (CCR) message specified in accordance with a Diameter protocol or a re-auth-request (RAR) message specified in accordance with the Diameter protocol.

Monitoring client 10 may further, in response to receiving information sufficient to complete the indication to activate the usage monitoring, activate the previously configured usage monitoring to begin accumulating usage information for the session. As noted above, this usage information may be on a time or data basis with respect to one or more sessions, services, etc. Monitoring client 10 may receive, in this context, the information sufficient to complete the indication to activate the usage monitoring in the form of a message having an Event-Trigger AVP with a value of "USAGE_REPORT" for the service provided via the session. Monitoring client 10 may, upon receiving this Event-Trigger AVP, activate usage monitoring and thereby accumulate the usage information, which monitoring client 10 may report (e.g., periodically or at the end of the session) to PCRF 24, online charging server 14 and/or offline charging server 15. Again, the messages may include one of a CCR message specified in accordance with a Diameter protocol or a RAR message specified in accordance with the Diameter protocol.

Monitoring client 10 may further, in response to receiving an indication to deactivate the usage monitoring for the session, report the accumulated usage information deactivate the activated usage monitoring. In this instance, the indication to deactivate the usage monitoring may include a message having an Event-Trigger attribute-value pair with a value set to "NO_EVENT_TRIGGERS." Again, these messages may comprise CCR or RAR messages.

In accordance with various aspects of the techniques described in this disclosure, monitoring client 10 may transmit a usage monitoring report indicative of usage of a service for which usage monitoring was previously activated and receive, in response to the usage monitoring report, an indication to deactivate usage monitoring for the service in the manner described above. In response to the indication to deactivate the usage monitoring, monitoring client 10 may remove any monitoring keys that were configured as a result of activating the usage monitoring.

Monitoring client 10 may transmit the usage report by, at least in part, transmitting a message with an Event-Trigger attribute-value pair having a value set to "USAGE_REPORT" along with the usage monitoring report. An example of the message may include a CCR message specified in accordance with a Diameter protocol. Monitoring client 10 may receive the indication to deactivate the usage monitoring in the form of a message having a Usage-Monitoring-Support attribute-value pair with a value set to "USAGE_MONITORING DISABLED." The message, as one example, may represent a credit control answer (CCA) message specified in accordance with a Diameter protocol. Monitoring client 10 may remove the monitoring key by deleting, in response to the indication to deactivate the usage monitoring, the monitoring key without sending another usage monitoring report. Monitoring client 10 may not send another usage report given that PCRF 24 elected to deactivate or otherwise discontinue monitoring in response to a previously sent usage report. Any incremental usage during the time between sending the CCR message with the usage report and receiving the CCA message deactivating usage monitoring may not warrant the additional complexity of reporting usage after usage monitoring (from the perspective of PCRF 24) has been deactivated.

In accordance with various aspects of the techniques of this disclosure, PGW 30 may establish a session by which a wireless device 6 is to access one or more services in the manner noted above. In response to receiving an indication to activate a charging rule having an incomplete indication to activate usage monitoring with respect to a service provided via the session, PGW 30 may invoke monitoring client 10, which may reject the charging rule. In other words, when monitoring client 10 receives the dynamic rule from PCRF 24 via a Charging-Rule-Definition AVP along with a Monitoring-Key AVP but without the Usage-Monitoring-Information with same Monitoring-Key AVP, monitoring client 10 may reject the rule. Likewise, when monitoring client 10 has not received the Usage-Monitoring-Information AVP earlier (through earlier RAR/CCA messages), monitoring client 10 may reject the rule. Monitoring client 10 may also send a CCR-U with Charging-Rule-Report AVP. Monitoring client 10 may reject the rule irrespective of whether monitoring client 10 had received an Event-Trigger AVP set to 'USAGE_REPORT.' Monitoring client 10 may add a new result_code in the CCR-U to indicate this error.

Moreover, when monitoring client 10 receives a Charging-Rule-Install AVP for a predefined rule (e.g., PCRF activates a predefined rule), where the rule is configured with a Monitoring-Key AVP and the received message does not include the Usage-Monitoring-Information AVP with the same Monitoring-Key or monitoring client 10 had not received the Usage-Monitoring-Information AVP earlier (through earlier RAR/CCA messages), monitoring client 10 may reject the rule. As noted above, monitoring client 10 may send the CCR-U with the Charging-Rule-Report AVP. monitoring client 10 may reject the rule irrespective of whether monitoring client 10 had received an Event-Trigger AVP set to 'USAGE_REPORT'. Monitoring client 10 may, in this example, add a new result_code in the CCR-U to indicate this error.

In other words, the charging rule may in some instances include a dynamic charging rule. Monitoring client 10 may, in response to receiving the indication to activate the dynamic charging rule having the incomplete indication to activate the usage monitoring with respect to the service provided via the session, reject the dynamic charging rule. More specifically, monitoring client 10 may determine that indication to activate the usage monitoring is incomplete upon receiving a message having a Charging-Rule-Definition AVP and a Monitoring-Key AVP with a value set to a monitoring key without having received, via a previous message or this current message, a Usage-Monitoring-Information AVP with a value set to the same monitoring key. As a result, monitoring client 10 may reject the dynamic charging rule.

In some instances, the charging rule may include a predefined charging rule. Monitoring client 10 may, in response to receiving the indication to activate the predefined charging rule having an incomplete indication to activate the usage monitoring with respect to the service provided via the session, reject the predefined charging rule. More specifically, monitoring client 10 may determine that the indication to activate the usage monitoring is incomplete upon receiving a message having a Charging-Rule-Install AVP with a value identifying the predefined charging rule without having received, via a previous message or the current message, a Usage-Monitoring-Information AVP with a value set to the same monitoring key. As a result, monitoring client 10 may reject the predefined charging rule.

When rejecting the charging rule, monitoring client 10 may as noted above reject the charging rule regardless of whether an Event-Trigger attribute-value pair with a value set to "USAGE_REPORT" has been received by the mobile gateway for the session. To reject the charging rule whether dynamic or predefined, monitoring client 10 may transmit a CCR-U message with a Charging-Rule-Report AVP having a value set to indicate an error code to PCRF 24.

Figure 3:
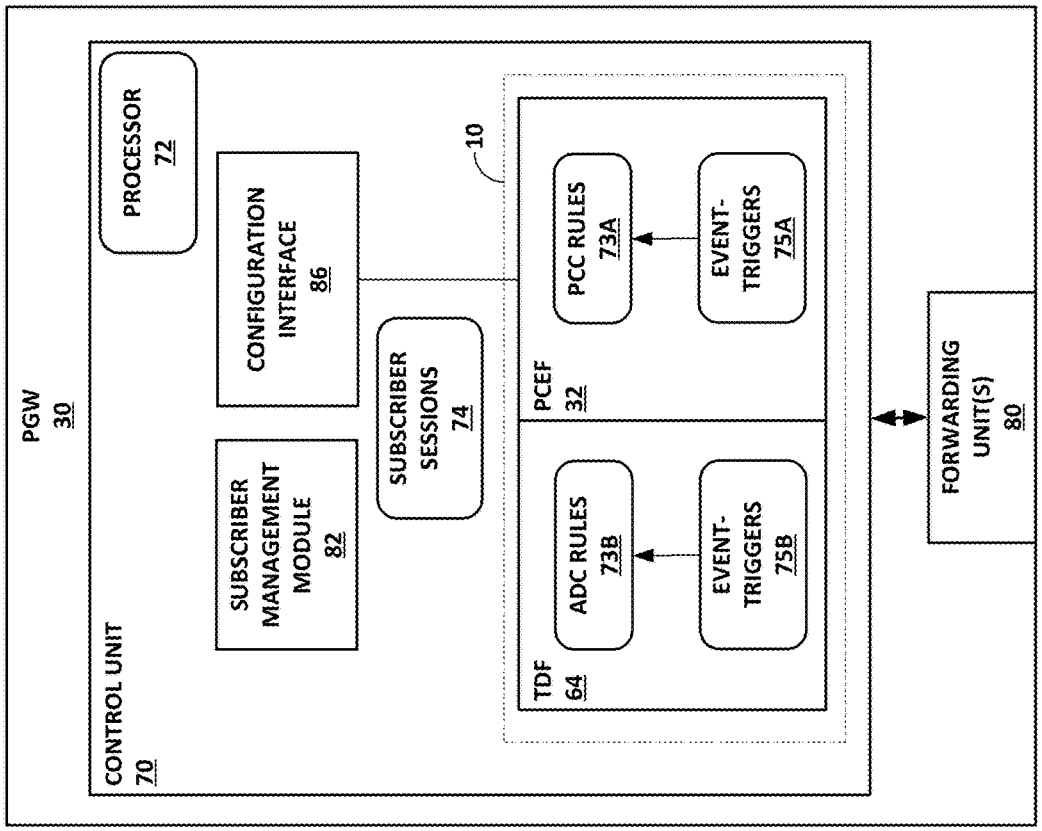
FIG. 3 is a block diagram illustrating an example mobile network gateway that performs the usage monitoring control techniques described in this disclosure.

FIG. 3 is a block diagram illustrating an example mobile network gateway that performs the usage monitoring control techniques described in this disclosure. PGW 30 may represent an example instance of mobile network gateway 8 of FIG. 1 or PGW 30 of FIG. 2. Control unit 70 includes one or more processor(s) 72 that execute software instructions, such as those used to define a software or computer program, stored to a tangible computer-readable medium (not shown in FIG. 3), such as a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, or in addition, control unit 70 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware.

Control unit 70 of PGW 30 provides an operating environment for subscriber management module 82, bearer module 84, configuration interface 86, PCEF 32 and TDF 64 (where PCEF 32 and TDF 64 may be collectively referred to as monitoring client 10). In some examples, PGW 30 may not include TDF 64. Subscriber management module 82 establishes one or more subscriber sessions 74 for a mobile network served by PGW 30 and manages the subscriber sessions once established. Subscriber management module 82 may store session data, received in control plane protocol messages received by PGW 30 or allocated by subscriber management module 82, for one or more subscriber sessions 74 in corresponding session contexts (also referred to as PDP contexts).

A session context stored for a subscriber session may include, for example, the PDP address allocated by the mobile network for the wireless device for use in sending and receiving user packets, routing information used by bearer module 84 in forwarding user packets such as tunnel endpoint identifiers (TEIDs) and identifiers/addresses for downstream nodes, the APN for the session, and quality of service (QoS) profiles. In some examples, functional aspects of control unit 70 are performed by a decentralized architecture or one or more services cards or "subscriber management service units." As a result, PGW 30 may achieve increased scalability to handle thousands or millions of concurrent communication sessions from mobile devices. Additional details regarding subscriber management are found in U.S. Pat. No. 8,650,279, filed Jun. 29, 2011 and entitled "MOBILE NETWORK GATEWAY HAVING DECENTRALIZED CONTROL PLANE FOR ANCHORING SUBSCRIBER SESSIONS," which is incorporated by reference herein in its entirety.

Forwarding unit 80 represents a forwarding plane of PGW 30 and may include one or more network interfaces and forwarding components for forwarding service data traffic. PGW 30 may also, in some examples, include a distributed forwarding plane. Subscriber management module 82 may install forwarding information to forwarding unit 80 for processing and forwarding data traffic from the mobile devices. Forwarding unit 80, for instance, receives user packets, maps the user packets to a session context of subscriber sessions 74, and applies forwarding information to forward the user packets according to the session context data. For example, forwarding of downstream user packets by forwarding unit 80 for a particular subscriber session may include encapsulating the user packets using the GPRS Tunneling Protocol (GTP) and setting the specified downstream TED for the session within a GTP header. Forwarding unit 80 may receive a representation of rating groups 64 and perform aspects of PCEF 32 for subscriber sessions 74 to permit high-speed credit control. Example details on subscriber management module 82 constructing subscriber-specific forwarding paths within forwarding unit 80 can be found in U.S. patent application Ser. No. 13/172,505, filed Jun. 29, 2011 and entitled "VARIABLE-BASED FORWARDING PATH CONSTRUCTION FOR PACKET PROCESSING WITHIN A NETWORK DEVICE," the entire contents being incorporated herein by reference.

Configuration interface 86 of control unit 70 by which a network management system, a PCRF, or in some instances an administrator, sets configuration information to install subscription information, static PCC rules, and other configuration data to control the operation of PGW 30 with respect to subscriber sessions 74. Configuration interface 86 may include a command line interface and/or graphical user interface (CLI or GUI) or execute a device management protocol such as NETCONF or Simple Network Management Protocol (SNMP), for instance, to request and set configuration information, such as static ones of PCC rules 73A or ADC rules 73B and corresponding Event-Triggers 75A or 75B. PGW 30 may implement configuration information using a management information base (MIB).

As noted above, a bearer established for one of subscriber sessions 74 is associated with one of PCC rules 73A, one of ADC rules 73B or both one of PCC rules 73A and ADC rules 73B. The PCC/ADC rules 73A/73B ("rules 73") associated with the bearer is also associated with a corresponding one or more event-triggers 75A/75B ("event-triggers 75"). PGW 30 may receive install these rules 73 as a result of, as noted above, receiving PCC/ADC rule installation messages. PGW 30 may receive further messages that include Event-Trigger AVPs that define event-triggers 75.

In accordance with various aspects of the techniques of this disclosure, PGW 30 may establish a session by which a wireless device 6 is to access one or more services in the manner noted above. In response to receiving an indication to activate a rule having an incomplete indication to activate usage monitoring with respect to a service provided via the session, PGW 30 may invoke monitoring client 10, which may reject the charging rule. In other words, when monitoring client 10 receives the dynamic rule from PCRF via a Charging-Rule-Definition AVP along with a Monitoring-Key AVP but without the Usage-Monitoring-Information with the same Monitoring-Key AVP, monitoring client 10 may reject the rule. Likewise, when monitoring client 10 has not received the Usage-Monitoring-Information AVP earlier (through earlier RAR/CCA messages), monitoring client 10 may reject the rule. Monitoring client 10 may also send a CCR-U with Charging-Rule-Report AVP. Monitoring client 10 may reject the rule irrespective of whether monitoring client 10 had received an Event-Trigger AVP set to 'USAGE_REPORT.' Monitoring client 10 may add a new result_code in the CCR-U to indicate this error.

Moreover, when monitoring client 10 receives a Charging-Rule-Install AVP for a predefined rule (e.g., PCRF activates a predefined rule), where the rule is configured with a Monitoring-Key AVP and the received message does not include the Usage-Monitoring-Information AVP with the same Monitoring-Key or the TDF had not received the Usage-Monitoring-Information AVP earlier (through earlier RAR/CCA messages), monitoring client 10 may reject the rule. As noted above, monitoring client 10 may send the CCR-U with the Charging-Rule-Report AVP. Monitoring client 10 may reject the rule irrespective of whether monitoring client 10 had received an Event-Trigger AVP set to 'USAGE_REPORT'. TDF 64 may, in this example, add a new result_code in the CCR-U to indicate this error.

In other words, one of rules 73 may in some instances include a dynamic charging rule. Monitoring client 10 may, in response to receiving the indication to activate the dynamic charging rule having the incomplete indication to activate the usage monitoring with respect to a service provided via the session, reject the dynamic one of rules 73. More specifically, monitoring client 10 may determine that indication to activate the usage monitoring is incomplete upon receiving a message having a Charging-Rule-Definition AVP and a Monitoring-Key AVP with a value set to a monitoring key without having received, via a previous message or this current message, a Usage-Monitoring-Information AVP with a value set to the same monitoring key. As a result, monitoring client 10 may reject the dynamic one of rules 73.

In some instances, the one of rules 73 may include a predefined one of rules 73. Monitoring client 10 may, in response to receiving the indication to activate the predefined one of rules 73 having an incomplete indication to activate the usage monitoring with respect to a service provided via the session, reject the predefined one of rule 73. More specifically, Monitoring client 10 may determine that the indication to activate the usage monitoring is incomplete upon receiving a message having a Charging-Rule-Install AVP with a value identifying the predefined charging rule without having received, via a previous message or the current message, a Usage-Monitoring-Information AVP with a value set to the same monitoring key. As a result, monitoring client 10 may reject the predefined one of rules 73.

When rejecting the charging rule, monitoring client 10 may as noted above reject the one of rules 73 regardless of whether an Event-Trigger attribute-value pair with a value set to "USAGE_REPORT" has been received by the mobile gateway for the service provided via the session (and stored as one of event-triggers 75). To reject the one of rules 73 whether dynamic or predefined, monitoring client 10 may transmit a CCR-U message with a Charging-Rule-Report AVP having a value set to indicate an error code to PCRF 24.

Figure 4:
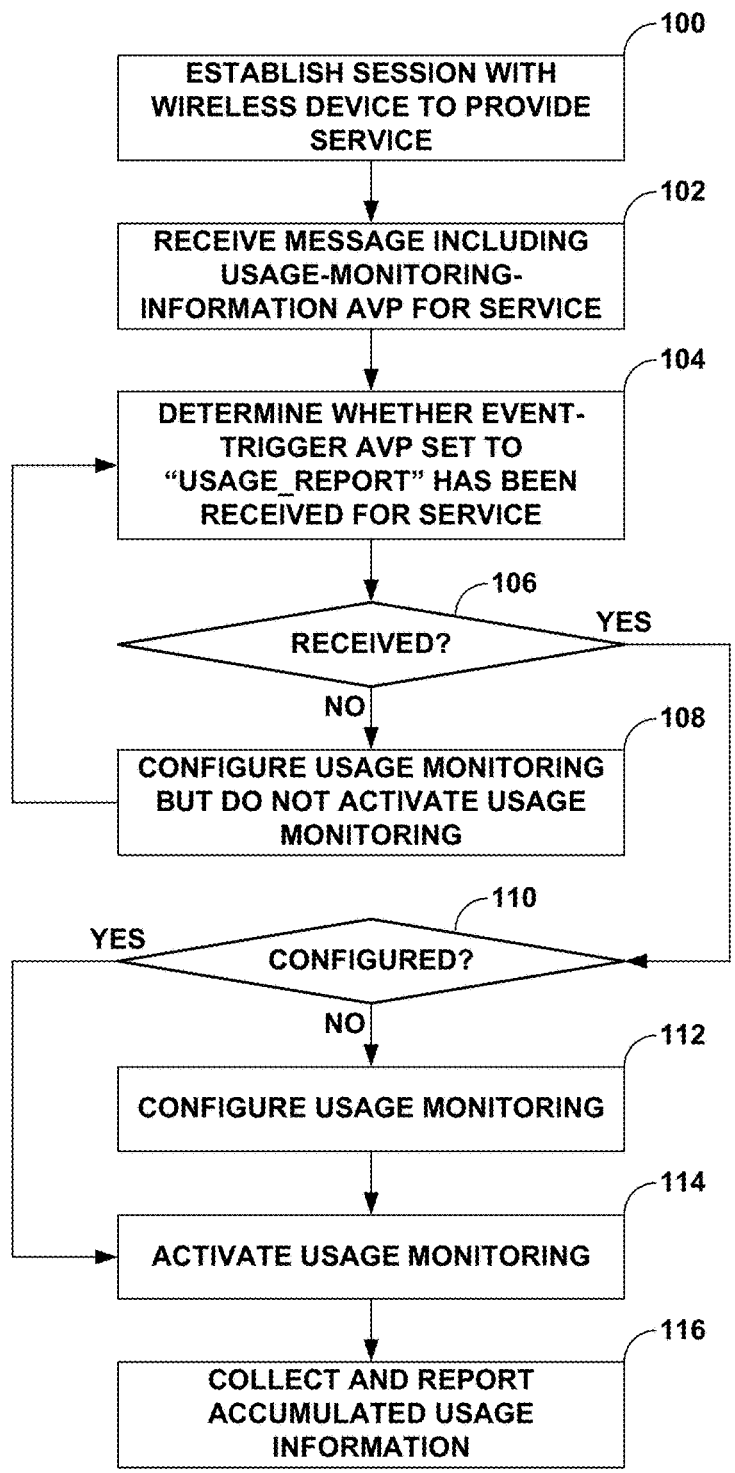
FIGS. 4-6 are flowcharts illustrating exemplary operations of a mobile gateway in performing various aspects of the usage monitoring control techniques described in this disclosure.
Figure 5:
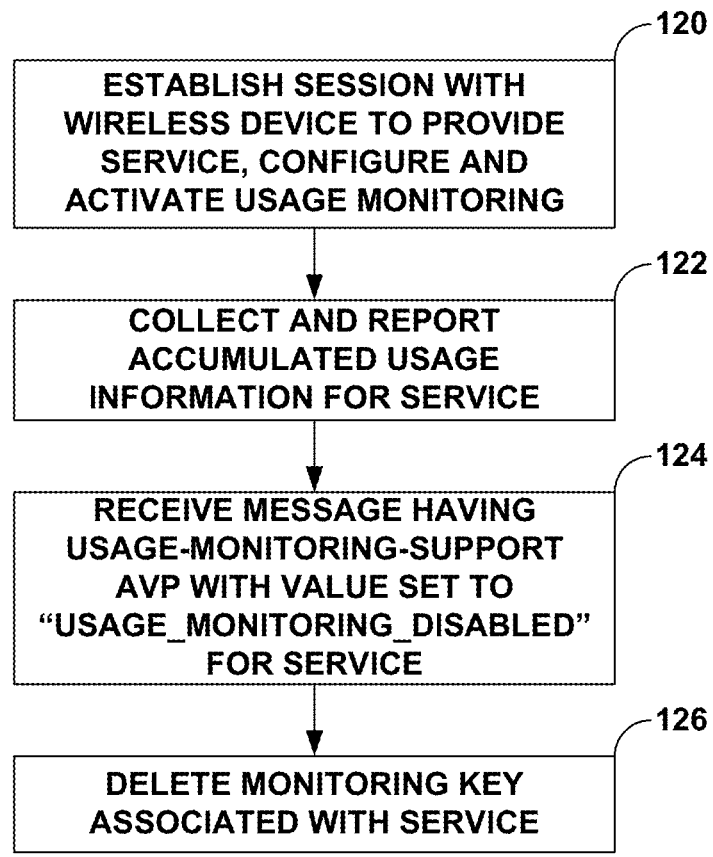
Figure 6:
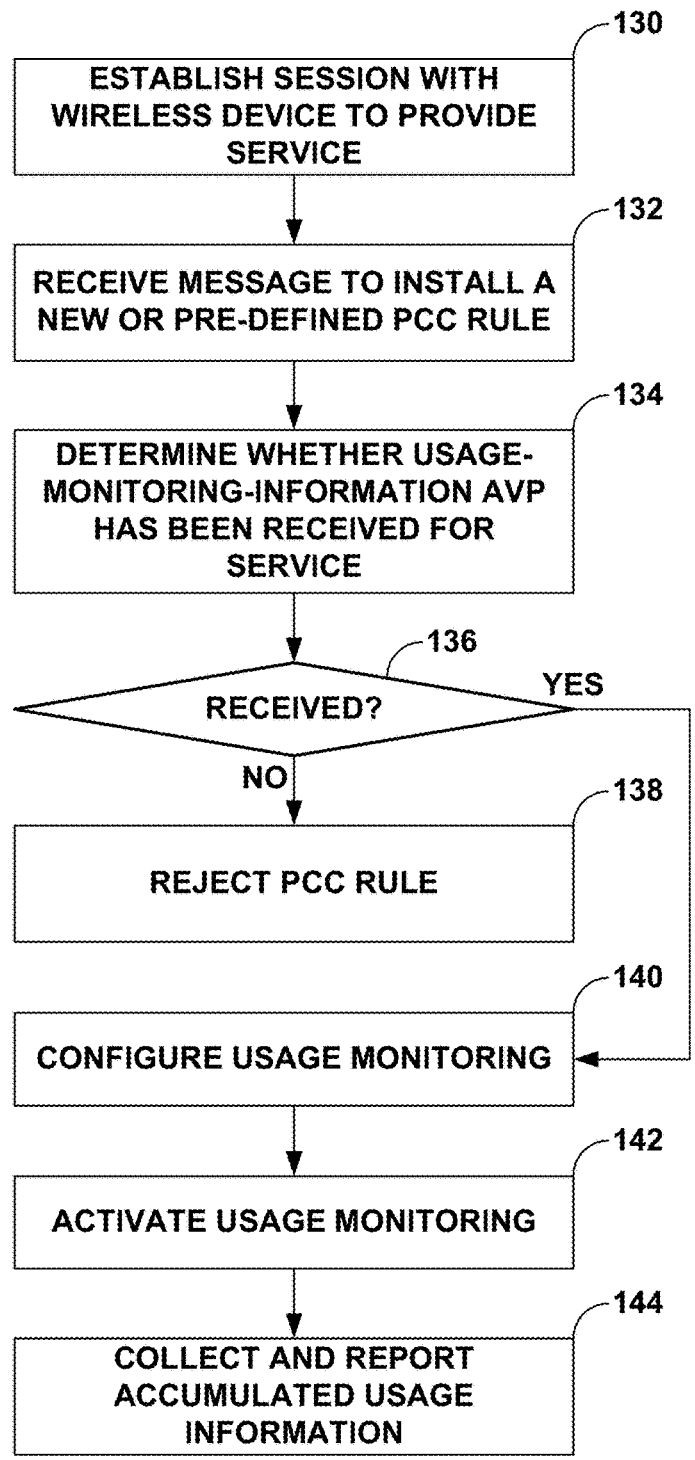

FIGS. 4-6 are flowcharts illustrating exemplary operation of a mobile gateway in performing various aspects of the usage monitoring control techniques described in this disclosure. With reference to the example of FIG. 4, a mobile gateway, such as PGW 30 shown in the examples of FIGS. 2 and 3, may establish a session, e.g., bearer 50, with a wireless device 6. PCRF 24 may send a message (e.g., a CCA or RAR message) including a Usage-Monitoring-Information AVP for the session. PGW 30 may receive this message including the Usage-Monitoring-Information AVP (100), invoking monitoring client 10 to store this AVP to a corresponding one of rules 73.

Monitoring client 10 may then determine whether an Event-Trigger AVP set to "USAGE_REPORT" has been received for the service provided via the session (e.g., either in the message that included the Usage-Monitoring-Information AVP or in a previous message and stored to event-triggers 75) (102). When the Event-Trigger AVP has not been received ("NO" 106), monitoring client 10 may configure usage monitoring for the session but does not activate the usage monitoring for the session, as described above (108). Monitoring client 10 may then continue to determine whether the Event-Trigger AVP having a value set to "USAGE_REPORT" has been received (104). In the event monitoring client 10 determines that the Event-Trigger AVP having a value set to "USAGE_REPORT" has been received ("YES" 106), monitoring client 10 may then determine whether usage monitoring has been previously configured (110). When usage monitoring has not been previously configured ("NO" 110), monitoring client 10 may configure usage monitoring and then activate the usage monitoring (e.g., by actively installing the configured objects monitoring objects so that usage information may be accumulated) (112, 114). When usage monitoring has been previously configured ("YES" 110), monitoring client 10 may activate the usage monitoring by installing the objects into the forwarding plane (114). Once activated, monitoring client 10 may collect and report accumulated usage information (116).

With reference to the example of FIG. 5, PGW 30 may establish a session with wireless device 6, configure and activate usage monitoring (120) in the manner described above with respect to the example of FIG. 4. PGW 30 may, when usage monitoring is activated, invoke monitoring client 10 to collect and report accumulated usage information to PCRF 24 (122). In response to reporting this usage information, PCRF 24 may elect to transmit a message having a Usage-Monitoring-Information AVP with a value set to "USAGE_MONITORING_DISABLED" for the session. In other words, PCRF 24 may elect to disable usage monitoring by notifying monitoring client 10 through the Usage-Monitoring-Information AVP with a value set to "USAGE_MONITORING_DISABLED." Monitoring client 10 may receive this message having a Usage-Monitoring-Information AVP with a value set to "USAGE_MONITORING_DISABLED" for the service provided via the session (124). Monitoring client 10 may then delete the monitoring key associated with the service provided via the session identified by the message (126).

With reference to the example of FIG. 6, PGW 30 may establish a session with wireless device 6 in the manner described above (130). PGW 30 may next receive a message to install a new PCC/ADC rule or activate a predefined PCC/ADC rule, again as described above (132). PGW 30 may invoke monitoring client 10, which may attempt to update rules 73 to include or otherwise install the new PCC/ADC rule (regardless of whether dynamic or predefined). Monitoring client 10 may install this new rule as one of rules 73 and determine whether a Usage-Monitoring-Information AVP has been received for the session (or, in other words, whether usage monitoring had been configured for the session) (134). When the Usage-Monitoring-Information AVP has not yet been received ("NO" 136), monitoring client 10 may reject the PCC/ADC rule in the manner described above (138). When the Usage-Monitoring-Information AVP has been received ("YES" 136), monitoring client 10 may configure usage monitoring for the service provided via the session, activate the usage monitoring for the service provided via the session and collect and report accumulated usage information (140-144).

In some examples, monitoring client 10 may determine, similar to the example of FIG. 4, whether the appropriate Event-Trigger AVP has been received prior to activating usage monitoring and collecting and reporting accumulated usage information. In other words, while various aspects of the techniques have been described as being performed independently from one another, the various aspects may be performed in conjunction with one another. For example, the Event-Trigger AVP aspects of the techniques (e.g., described with respect to FIG. 4) may be performed with either or both of the deactivation aspects of the techniques (e.g., described with respect to FIG. 5) and the rule-install aspects of the techniques (e.g., described with respect to FIG. 6). Likewise, the deactivation aspects of the techniques (e.g., described with respect to FIG. 5) may be performed with either or both of the Event-Trigger AVP aspects of the techniques (e.g., described with respect to FIG. 4) and the rule-install aspects of the techniques (e.g., described with respect to FIG. 6). Furthermore, the rule-install aspects of the techniques (e.g., described with respect to FIG. 6) may be performed with either or both of the Event-Trigger AVP aspects of the techniques (e.g., described with respect to FIG. 4) and the deactivation aspects of the techniques (e.g., described with respect to FIG. 5).

Figure 7:
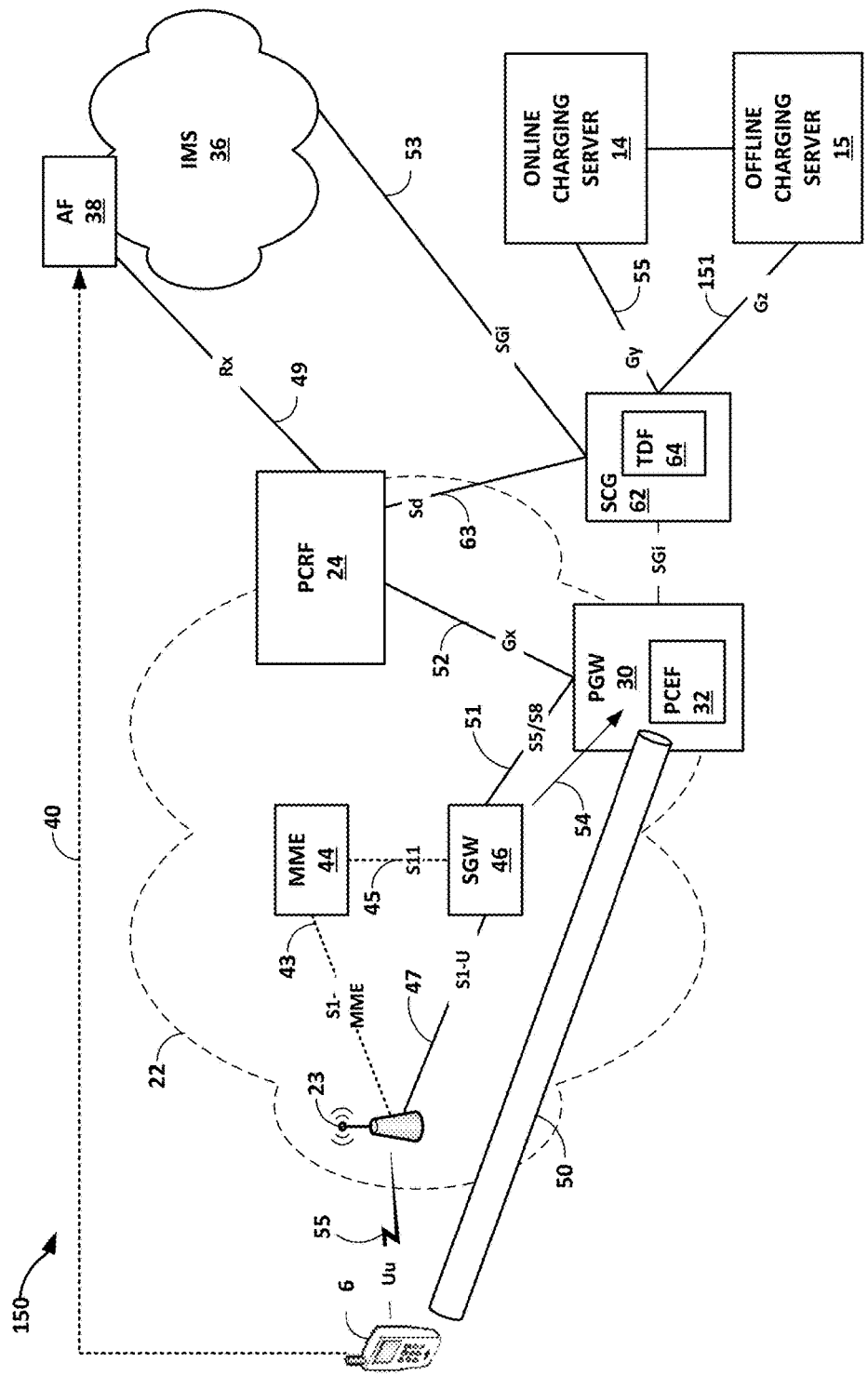
FIG. 7 is a block diagram illustrating another example network system that performs the usage monitoring control techniques described in this disclosure.

FIG. 7 is a block diagram illustrating another example network system 150 that performs the usage monitoring control techniques described in this disclosure. Network system 150 may represent an example instance of network system 2 of FIG. 1. Network system 150 may be similar to network system 20 shown in the example of FIG. 2, except that TDF 64 has been offloaded from PGW 30 to a dedicated service control gateway (SCG) 62. In some cases, SCG 62 may alternatively be referred to as an application delivery controller (ADC), services delivery gateway (SDG), or other device that performs functionality similar to that described herein, in particular with respect to TDF 64. SCG 62 may provide service control functions to facilitate establishment, configuration and monitoring with respect to services offered by mobile access network 22. SCG 62 may execute TDF 64, which may perform the techniques described in this disclosure. Although shown as a separate network device, SCG 62 may also be logically executed within PGW 30 or any other network device. SCG 62 may, in some instances, refer to a dedicated computing device (which may be referred to as a "service blade") installed in a service plane of a router (e.g., PGW 30). The techniques should therefore not be limited in this respect to the dedicated network device shown in the example of FIG. 7.

Moreover, SCG 62 interfaces with PGW 30 via SGi interface 53 and also communicates with IMS 36 through a dedicated SGi interface 53. SCG 62 also communicates with offline charging service 15 via a Gz interface 151, which is different but similar to Ga interface 57 shown in the example of FIG. 2. SCG 62 maintains Sd interface 63 to communicate with PCRF 24 in the manner noted above.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
   establishing, with a service control gateway positioned between an access gateway for a mobile access network and a packet data network that provides a service, a session by which a mobile device is to access the service;
   determining, by one or more processors of the service gateway, that the service gateway has incomplete information to activate usage monitoring of the service responsive to receipt of a message to activate a charging rule that includes a request to activate usage monitoring for a service identified by an identifier without having received any message associating the identifier to the service provided via the session: and
   in response to receiving an indication to activate a charging rule having an incomplete indication to activate usage monitoring with respect to the service provided via the session, rejecting the charging rule.

2. The method of claim 1, wherein the charging rule comprises a dynamic charging rule, and wherein rejecting the charging rule comprises, in response to receiving the indication to activate the dynamic charging rule having the incomplete indication to activate the usage monitoring with respect to the service provided via the session, rejecting the dynamic charging rule.

3. The method of claim 1,
   wherein the charging rule comprises a dynamic charging rule,
   wherein the method further comprises determining that the service gateway has received the incomplete indication to activate the usage monitoring upon receiving a message having a Charging-Rule-Definition attribute-value pair and a Monitoring-Key attribute-value pair with a value set to a monitoring key without having received, via a previous message or the message, a Usage-Monitoring-Information attribute-value pair with a value set to the same monitoring key, and wherein rejecting the charging rule comprises, in response to receiving the indication to activate the dynamic charging rule having the incomplete indication to activate the usage monitoring with respect to the service provided via the session, rejecting the dynamic charging rule.

4. The method of claim 1, wherein the charging rule comprises a predefined charging rule, and wherein rejecting the charging rule comprises, in response to receiving the indication to activate the predefined charging rule having an incomplete indication to activate the usage monitoring with respect to the service provided via the session, rejecting the predefined charging rule.

5. The method of claim 1,
   wherein the charging rule comprises a predefined charging rule for which a monitoring key has been configured, wherein the method further comprises determining that the service gateway has received the incomplete indication to activate the usage monitoring upon receiving a message having a Charging-Rule-Install attribute-value pair with a value identifying the predefined charging rule without having received, via a previous message or the message, a Usage-Monitoring-Information attribute-value pair with a value set to the same monitoring key, and wherein rejecting the charging rule comprises, in response to receiving the indication to activate the predefined charging rule having the incomplete indication to activate the usage monitoring with respect to the service provided via the session, rejecting the predefined charging rule.

6. The method of claim 1, wherein rejecting the charging rule comprises rejecting the charging rule regardless of whether an Event-Trigger attribute-value pair with a value set to "USAGEREPORT" has been received by the mobile service gateway for the service provided via the session.

7. The method of claim 1, wherein rejecting the charging rule comprises transmitting a message with a Charging-Rule-Report attribute-value pair having a value set to indicate an error code.

8. The method of claim 1, wherein the service gateway comprises a router having a service control gateway that performs the usage monitoring.

9. A service gateway comprising:
   one or more processors configured to establish a session by which a mobile device is to access a service, determine that the service gateway has incomplete information to activate usage monitoring of the service responsive to receipt of a message to activate a charging rule that includes a request to activate usage monitoring for a service identified by an identifier without having received any message associating the identifier to the service provided via the session, and in response to receiving an indication to activate a charging rule having an incomplete indication to activate usage monitoring with respect to the service provided via the session, rejecting reject the charging rule.

10. The mobile service gateway of claim 9,
    wherein the charging rule comprises a dynamic charging rule, and wherein the one or more processors are configured to, in response to receiving the indication to activate the dynamic charging rule having the incomplete indication to activate the usage monitoring with respect to the service provided via the session, reject the dynamic charging rule.

11. The service gateway of claim 9, wherein the charging rule comprises a dynamic charging rule, wherein the one or more processors are further configured to determine that the mobile service gateway has received the incomplete indication to activate the usage monitoring upon receiving a message having a Charging-Rule-Definition attribute-value pair and a Monitoring-Key attribute-value pair with a value set to a monitoring key without having received, via a previous message or the message, a Usage-Monitoring-Information attribute-value pair with a value set to the same monitoring key, and wherein the one or more processors are configured to, in response to receiving the indication to activate the dynamic charging rule having the incomplete indication to activate the usage monitoring with respect to the service provided via the session, reject the dynamic charging rule.

12. The service gateway of claim 9, wherein the charging rule comprises a predefined charging rule, and wherein the one or more processors are configured to, in response to receiving the indication to activate the predefined charging rule having an incomplete indication to activate the usage monitoring with respect to the service provided via the session, reject the predefined charging rule.

13. The service gateway of claim 9, wherein the charging rule comprises a predefined charging rule for which a monitoring key has been configured, wherein the one or more processors are configured to determine that the service gateway has received the incomplete indication to activate the usage monitoring upon receiving a message having a Charging-Rule-Install attribute-value pair with a value identifying the predefined charging rule without having received, via a previous message or the message, a Usage-Monitoring-Information attribute-value pair with a value set to the same monitoring key, and wherein the one or more processors are configured to, in response to receiving the indication to activate the predefined charging rule having the incomplete indication to activate the usage monitoring with respect to the service provided via the session, reject the predefined charging rule.

14. The service gateway of claim 9, wherein the one or more processors are configured to reject the charging rule regardless of whether an Event-Trigger attribute-value pair with a value set to "USAGEREPORT" has been received by the service gateway for the service provided via the session.

15. The mobile gateway of claim 9, wherein the one or more processors are configured to transmit a message with a Charging-Rule-Report attribute-value pair having a value set to indicate an error code.

16. The service gateway of claim 9, wherein the service gateway comprises a router.

17. A system comprising:
a mobile device; and a service gateway positioned between an access gateway for a mobile access network and a packet data network that provides a service, wherein the service gateway comprises: one or more processors configured to establish a session by which the mobile device is to access a service, determine that the service gateway has incomplete information to activate usage monitoring of the service responsive to receipt of a message to activate a charging rule that includes a request to activate usage monitoring for a service identified by an identifier without having received any message associating the identifier to the service provided via the session, and in response to receiving an indication to activate a charging rule having an incomplete indication to activate usage monitoring with respect to the service provided via the session, reject the charging rule.

18. The system of claim 17, wherein the charging rule comprises a dynamic charging rule, wherein the one or more processors are configured to determine that the service gateway has received the incomplete indication to activate the usage monitoring upon receiving a message having a Charging-Rule-Definition attribute-value pair and a Monitoring-Key attribute-value pair with a value set to a monitoring key without having received, via a previous message or the message, a Usage-Monitoring-Information attribute-value pair with a value set to the same monitoring key, and wherein the one or more processors are configured to, in response to receiving the indication to activate the dynamic charging rule having the incomplete indication to activate the usage monitoring with respect to the service provided via the session, reject the dynamic charging rule.

19. The system of claim 17, wherein the charging rule comprises a predefined charging rule for which a monitoring key has been configured, wherein the one or more processors are further configured to determine that the service gateway has received the incomplete indication to activate the usage monitoring upon receiving a message having a Charging-Rule-Install attribute-value pair with a value identifying the predefined charging rule without having received, via a previous message or the message, a Usage-Monitoring-Information attribute-value pair with a value set to the same monitoring key, and wherein the one or more processors are configured to, in response to receiving the indication to activate the predefined charging rule having the incomplete indication to activate the usage monitoring with respect to the service provided via the session, reject the predefined charging rule.

20. A non-transitory computer-readable storage medium having stored thereon instructions that, when executed, cause one or more processors of a service gateway to: establish a session by which a mobile device is to access a service; determine that the service gateway has incomplete information to activate usage monitoring of the service responsive to receipt of a message to activate a charging rule that includes a request to activate usage monitoring for a service identified by an identifier without having received any message associating the identifier to the service provided via the session; and in response to receiving an indication to activate a charging rule having an incomplete indication to activate usage monitoring with respect to the service provided via the session, reject the charging rule.

* * * * *